United States Patent [19]

Whiteside

[11] 4,310,077
[45] Jan. 12, 1982

[54] SHOCK ABSORBERS WITH IMPROVED COMPRESSIBLE CUSHIONS

[75] Inventor: John F. Whiteside, Franklin Park, Ill.
[73] Assignee: Maremont Corporation, Chicago, Ill.
[21] Appl. No.: 118,313
[22] Filed: Feb. 4, 1980
[51] Int. Cl.³ .............................................. F16F 9/50
[52] U.S. Cl. ................................... 188/282; 188/269; 188/315
[58] Field of Search ....................... 188/282, 315, 269; 267/64 R

[56] References Cited

U.S. PATENT DOCUMENTS

| | | | |
|---|---|---|---|
| 2,507,267 | 5/1950 | Patriquin | 188/279 |
| 2,815,829 | 12/1957 | Boehm et al. | 188/269 |
| 3,213,973 | 10/1965 | Damon | 188/315 |
| 3,771,626 | 11/1973 | Palmer | 267/64 R |
| 4,109,767 | 8/1978 | Nandyal et al. | 188/315 |
| 4,182,438 | 1/1980 | Pepi | 188/322 |

FOREIGN PATENT DOCUMENTS 544951  2/1956  Belgium ............................. 188/315

Primary Examiner—Bernard Nozick
Attorney, Agent, or Firm—Cushman, Darby & Cushman

[57] ABSTRACT

A direct acting hydraulic shock absorber of the twin tube type including inner and outer tubular members, having an improvement which comprises forming an opening in the inner tubular member adjacent an end thereof, mounting a sleeve of elastomeric material in surrounding relation to the exterior periphery of the inner tubular member in covering relation to the opening, and providing a rigid tube having a pair of axially spaced radially inwardly deformed annular beads disposed in spaced relation between the interior periphery of the inner tubular member and the exterior periphery of the outer tubular member in surrounding relation to the sleeve with the beads sealingly compressing the elastomeric material of the sleeve into sealing relation with the adjacent exterior periphery of the inner tubular member at annular positions spaced longitudinally on opposite sides of the opening so that hydraulic fluid within the cylindrical chamber subjected to pressure can pass through the opening for confinement by the portions of the exterior periphery of the inner tubular member and the interior periphery of the sleeve between the annular positions.

6 Claims, 3 Drawing Figures

SHOCK ABSORBERS WITH IMPROVED COMPRESSIBLE CUSHIONS

This invention relates to hydraulic shock absorbers and more particularly to improvements in shock absorbers of the twin tube double acting type.

In U.S. Pat. No. 2,815,829 there is disclosed a twin tube direct acting hydraulic shock absorber which is provided with means for reducing the harshness which sometimes occurs in operation under severe shock conditions. As disclosed in the patent, such means accommodates a movement of hydraulic fluid from either the compression space or the rebound space in response to the creation of a high pressure condition therein by virtue of the severe shock conditions encountered in addition to the usual control paths provided. This additional high pressure flow is allowed to take place through an opening in the wall of the cylinder into a closed annular chamber formed therearound having an air chamber backup. The specifics of the construction disclosed in the patent include welding a metallic annular member to the exterior periphery of the cylinder. The annular member has a generally U-shaped cross-sectional configuration with flanges extending from the free ends of the legs thereof. The free end of each of the flanges is welded to the cylinder.

In one embodiment of the disclosed patented subject matter, the annular chamber provided by the welded annular member serves as both the air chamber and the hydraulic chamber by communicating the annular chamber with the main cylinder chamber through an opening in the lower portion of the annular chamber. With this arrangement a direct oil-to-air interface is provided within the annular chamber. In another embodiment disclosed in the patent, the annular chamber provided by the welded annular member is filled with an elastomeric doughnut or torus which contains the air to be compressed and provides the interface between the air and the hydraulic fluid which may enter the annular space and compress the doughnut or torus. In order to positively prevent the mixing of the air and oil and hence the generation of air bubbles within the hydraulic fluid, it is desirable to provide an elastomeric member which defines the interface between the hydraulic fluid and the air chamber as in the arrangement disclosed in the patent utilizing the torus. However, the provision of a torus in a welded configuration such as disclosed in the patent is quite costly.

Accordingly, it is an object of the present invention to provide an arrangement of the type described which is effective to maintain a positive separation between the air and oil utilizing a construction which is economical to manufacture.

In accordance with the principles of the present invention, this objective is obtained by providing replenishing valve means between said compression space and said reservoir space, a simple sleeve of elastomeric material mounted in surrounding relation to the exterior periphery of the inner tubular member or cylinder in covering relation to the opening in the wall of the cylinder. A rigid tube having a pair of axially spaced radially inwardly deformed annular beads is disposed in spaced relation between the interior periphery of the cylinder and the exterior periphery of said outer tubular member or intermediate cylinder in surrounding relation to the sleeve. The beads serve to sealingly compress the elastomeric material of the sleeve into sealing relation with the adjacent exterior periphery of the cylinder at annular positions spaced longitudinally on opposite sides of the opening so that hydraulic fluid within the adjacent space of the cylinder subjected to pressure can pass through the opening for confinement by the portions of the exterior periphery of said inner tubular member and the interior periphery of said sleeve between the spaced annular positions. With this arrangement, an effectively sealed back-up air chamber and effectively sealed oil chamber are provided without the necessity to weld parts together or to fabricate hollow doughnut-shaped articles of elastomeric material.

Another object of the present invention is the provision of a shock absorber having an improved means of the type described which is effective in operation, simple in construction and economical to manufacture and maintain.

These and other objects of the present invention will become more apparent during the course of the following detailed description and appended claims.

The invention may best be understood with reference to the accompanying drawings, wherein an illustrative embodiment is shown.

Figure 1:
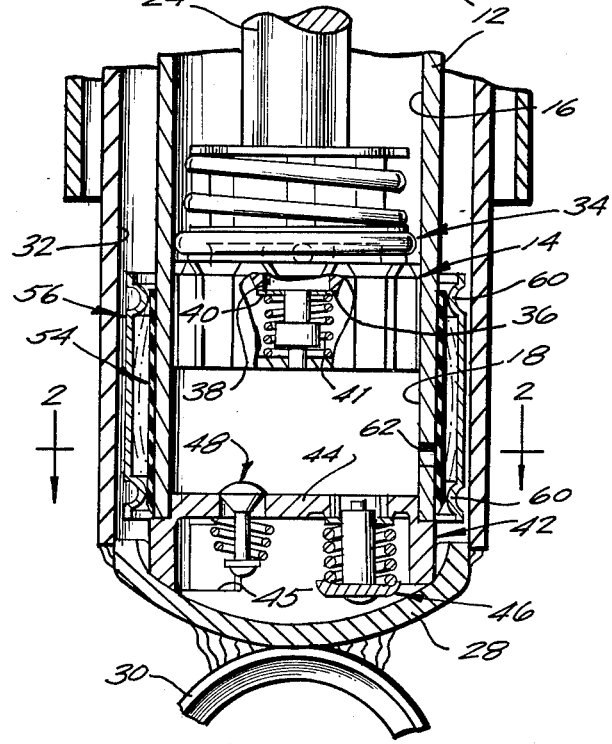
FIG. 1 is a vertical sectional view of a shock absorber embodying the principles of the present invention.

Referring now more particularly to FIG. 1 of the drawings, there is shown therein a direct acting hydraulic shock absorber, generally indicated at 10, adapted to be connected between the sprung and unsprung masses of a vehicle, which embodies the principles of the present invention.

In general, it can be stated that the unit 10 is constructed in the manner set forth in commonly-assigned U.S. Pat. No. 2,507,267, and hence the disclosure of this patent is hereby incorporated by reference into the present specification. For present purposes it is sufficient to note that the shock absorber 10 includes an inner tubular member or cylinder 12, which defines a cylindrical chamber within which is slidably mounted a piston assembly 14. The piston assembly 14 divides the cylinder into an upper rebound space 16 and a lower compression space 18. The upper end of the tubular member 12 has an end closure assembly 20 fixed thereto, which end closure assembly also receives the upper end of an outer tubular member or intermediate cylinder 22.

The end closure assembly 20 serves to slidably sealingly engage the exterior periphery of a piston rod 24 which extends into the rebound space 16 and is suitably connected with the piston assembly 14. The outer end of the piston rod has an appropriate connector 26 fixed thereon which serves to connect the shock absorber 10 to the sprung mass of the vehicle. The lower end of the outer tubular member 22 has an end cap or closure 28 fixed thereto which, in turn, has a connector 30 fixed to the central exterior thereof for connecting the lower end of the shock absorber 10 with the unsprung mass of the vehicle.

It will be understood that the rebound and compression spaces 16 and 18 are filled with hydraulic fluid, which hydraulic fluid also partially fills a replenishing space 32 formed between the exterior of the inner tubular member 12 and the interior of the outer tubular member 22. In order to control the flow of hydraulic fluid from the compression space 18 into the rebound space 16 during the compression movement of the shock absorber 10, there is provided in the piston 14 a spring pressed piston compression valve mechanism, generally indicated at 34. As shown, the compression valve mechanism 34 is constructed in accordance with the teachings contained in the aforesaid U.S. patent.

The piston 14 also defines a downwardly facing annular valve seat 36 which is disposed intermediate the opposite ends of the piston in surrounding relation to a central passage 38. A rebound valve 40 is disposed in cooperating relation with the valve seat 36. The valve 40 is resiliently urged into engagement with the seat 36 by a coil spring 41.

In order to accommodate the piston rod displacement during the telescopic movements of the unit, there is provided a base assembly, generally indicated at 42, which is positioned adjacent the lower end closure 28. The base assembly 42 includes a base member 44 which is fixedly connected with the lower end of the inner tubular member 12 and the interior of the end closure 28. The periphery of the base member 44 provides passages 45 between the replenishing space 32 and the space between the base member 44 and end closure 28. Mounted within the base member 44 is a compression valve assembly 46 and a replenishing valve 48. As shown, the shock absorber 10 also includes an exterior dust tube or outer cylinder 50 which surrounds the intermediate cylinder or outer tubular member 22 and is fixedly connected at its upper end to the juncture between the piston rod 24 and connector 26 as by an annular member 52.

It will be understood that the construction of the shock absorber 10 as thusfar described is similar to the shock absorber described in the aforesaid patent. The details of construction of the components thusfar described are not essential to an understanding of the present invention. Insofar as the details are concerned, reference may be made to the aforesaid patent, the disclosure of which is hereby incorporated by reference into the present specification. It will be understood that the components thusfar described may assume other configurations, as, for example, the configurations of U.S. Pat. No. 2,814,829 or No. 4,109,767, which disclose a specifically different base assembly 42 which may be utilized in lieu of the base assembly 42 described above.

Figure 2:
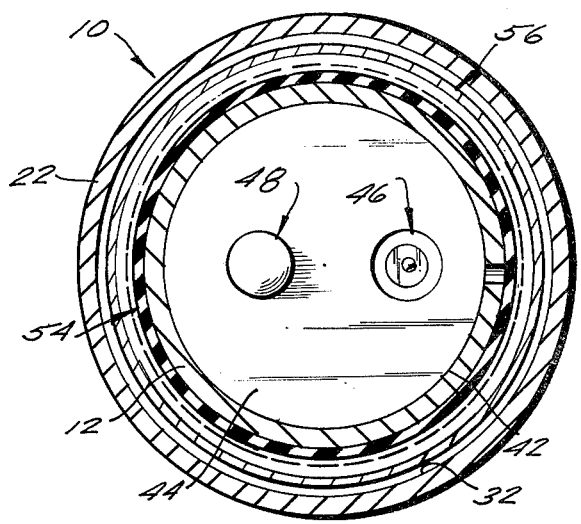
FIG. 2 is an enlarged sectional view taken along the line 2—2 of FIG. 1.
Figure 3:
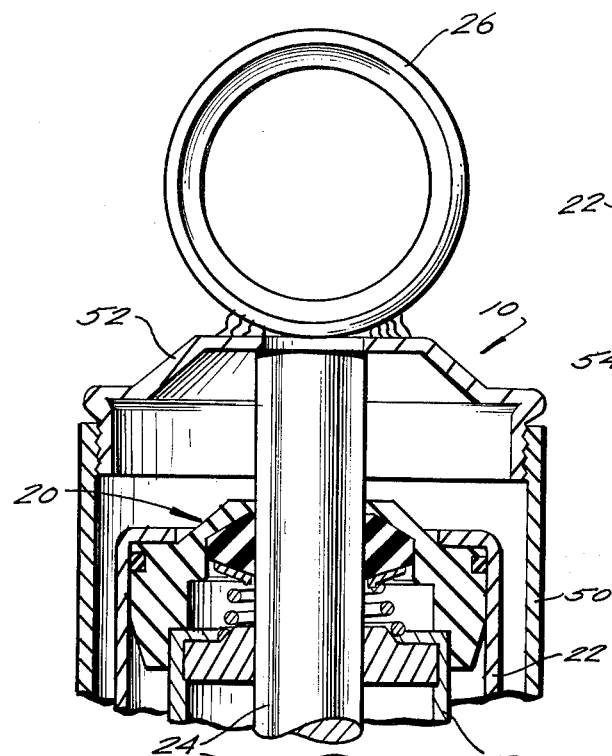
FIG. 3 is an enlarged fragmentary sectional view illustrating the connection of the elastomeric sleeve between the exterior periphery of the cylinder and the bead of the rigid tube.
Figure 3:
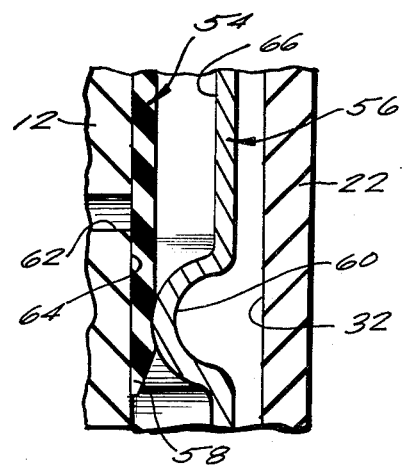

An essential characteristic of a shock absorber embodying the principles of the present invention is that it is of the dual or twin tube type embodying an inner tubular member or cylinder and an outer tubular member or intermediate cylinder which define therebetween an annular reservoir chamber. The riding characteristic improvements of the present invention are mounted within the annular chamber and consist essentially of two additional elements; one, an elastomeric sleeve, generally indicated at 54, and the other, a rigid tube, generally indicated at 56. Sleeve 54 is preferably made of any suitable elastomeric material, a preferred material being a polyester polymer such as the Hytrel family of polymers, an exemplary durometer being 55D. Preferably, the elastomeric sleeve is molded so that is has an as molded interior peripheral size slightly less than the exterior peripheral size of the inner tubular member or cylinder 12. It will also be understood that the interior configuration may be slightly frustoconical to facilitate removal from the mold. Preferably, the main central portion of the sleeve has a wall thickness which is constant throughout, such wall thickness being extended uniformly to one end portion with the other end portion being formed with a decreasing thickness, as indicated at 58 in FIG. 3. It will be understood that the diminishing wall thickness is formed by providing an exterior frustoconical configuration on the end portion.

The reduced end portion 58 of the sleeve 54 serves to facilitate mounting of the sleeve 54 within the tube 56. In this regard, it will be noted that the tube 56 is preferably made of a rigid material such as metal and has formed therein a pair of longitudinally spaced radially inwardly extending annular beads 60. Preferably, the beads 60 are of a semi-cylindrical cross-sectional configuration. The interior peripheral size of the beads 60 is slightly larger than the exterior peripheral size of the inner tubular member or cylinder 12 and the exterior peripheral size of the tube 56 is substantially less than the interior peripheral size of the outer tubular member 22. The tube 56 thus fits within the annular replenishing space 32 in spaced relation between the exterior periphery of the inner tubular member 12 and the interior periphery of the outer tubular member 22.

It will be noted that the longitudinal extent of the sleeve 54 is greater than the longitudinal spacing between the beads 60. When the sleeve 54 is mounted within the tube 56 the exterior periphery of the sleeve engages the interior periphery of the beads 60 at two longitudinally spaced positions. As previously indicated, the tapering end portion 58 facilitates the insertion of the sleeve 54 within the tube 56.

The tube 56 with the sleeve 54 inserted therein is mounted in surrounding relation to the exterior periphery of the cylinder 12 during the manufacture of the shock absorber 10. In the preferred embodiment shown, the mounting is in relation to the lower end of the cylinder which defines the compression space. Preferably, the mounting is effected by placing a bullet-shaped thimble or guide on the open end of the cylinder 12, lubricating the exterior of the guide and then slipping the tube/sleeve sub-assembly thereover until it is disposed in surrounding relation to the exterior periphery of the lower end of the cylinder. During this mounting, sleeve 54 is expanded outwardly slightly and the annular portions thereof engaged by the annular beads 60 are compressed so that there is formed at these spaced longitudinal positions a sealed relationship between the interior periphery of the sleeve and the exterior periphery of the cylinder 12 and between the exterior periphery of the sleeve and the interior periphery of the bead 60 of the tube 56.

Formed in the wall of the cylinder 12 in the lower end portion thereof surrounded by the sleeve 54 is an opening 62 which serves to communicate the hydraulic fluid within the compression space 18 with an expansible and contractible sealed chamber 64 defined by the adjacent portions of the exterior periphery of the cylinder 12 and the interior periphery of the sleeve 54 between the aforesaid longitudinally spaced portions of sealing engagement. The sealed expansible and contractible chamber 64 which receives hydraulic fluid through opening 62 is backed by a sealed annular air chamber 66 which is defined by the portions of the exterior periphery of the sleeve 54 and the interior periphery of the tube 56 between the aforesaid longitudinally spaced annular portions where the aforesaid sealing relationship is maintained.

In operation, when severe shock or load conditions are imposed upon the shock absorber tending to cause the same to move rapidly through a compression stroke, the increase in the pressure of the hydraulic fluid within the compression space will cause a flow of fluid to take place through the opening 62 and into the expansible sealed annular chamber 64, causing the elastomeric sleeve 54 to expand radially outwardly and thus contact the sealed annular air chamber 66. This movement of fluid is in addition to the normal movement which takes place in a controlled fashion past the piston compression valve mechanism 34 and through the base compression valve assembly 46. When the pressure of the hydraulic fluid within the compression space 18 is relieved counterflow from the expanded chamber 64 through the opening 62 into the compression space can take place. Essentially, the operation of the present arrangement is similar to the operation described in the aforesaid U.S. Pat. No. 2,814,829. Also in accordance with the teachings contained in the aforesaid patent, a similar operation may be utilized in connection with the rebound chamber. Thus, there is contemplated within the present invention that the tube/sleeve sub-assembly be be moved to the rebound end of the cylinder, in which case the opening 62 would be formed so as to move with the rebound space or an additional such sub-assembly may be provided. It is important to note that while the present arrangement provides essentially the same functions as are provided in the aforesaid patent, the structure which achieves these functions is considerably simpler and capable of being manufactured and assembled in a much simpler fashion.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. A direct acting hydraulic shock absorber adapted to be connected between the sprung and unsprung masses of a vehicle comprising inner and outer tubular members, said inner tubular member defining a cylindrical chamber, a piston slidably mounted within said cylindrical chamber, a piston rod extending from one side of said piston outwardly from one end of said inner tubular member, closure means on said one end of said inner tubular member closing the adjacent end of said outer tubular member and slidably sealingly engaging said piston rod, an end closure on the opposite end of said outer tubular member, connecting means for operatively connecting said shock absorber between said masses, hydraulic fluid filling rebound and compression spaces within said cylindrical chamber on the piston rod side of said piston and on the opposite side thereof respectively and partially filling an annular reservoir space between said inner and outer tubular members, said piston having a central passage therethrough, rebound valve means in said piston disposed in cooperating relation with said passage, said piston having compression valve mechanism radially outwardly of said central passage to control flow, compression valve means between said compression space and reservoir space, and replenishing valve means between said compression space and said reservoir space, the improvement which comprises said inner tubular member having an opening extending therethrough adjacent an end thereof, a sleeve of elastomeric material surrounding the exterior periphery of said inner tubular member in covering relation to said opening, and a rigid tube having a pair of axially spaced radially inwardly deformed annular beads disposed in spaced relation between the exterior periphery of said inner tubular member and the interior periphery of said outer tubular member in surrounding relation to said sleeve with said beads sealingly compressing the elastomeric material of the sleeve into sealing relation with the adjacent exterior periphery of said inner tubular member at annular positions spaced longitudinally on opposite sides of said opening so that hydraulic fluid within the adjacent space of said cylindrical chamber subjected to pressure can pass through said opening for confinement by the portions of the exterior periphery of said inner tubular member and the interior periphery of said sleeve between said annular positions.

2. A shock absorber as defined in claim 1 wherein said opening communicates with said compression space.

3. A shock absorber as defined in claim 1 wherein the portions of the exterior periphery of said sleeve and the interior periphery of said tube between said heads define a sealed annular air space.

4. A shock absorber as defined in claim 1 wherein said beads are of generally U-shaped cross-sectional configuration.

5. A shock absorber as defined in claim 1, 2, 3 or 4 wherein said sleeve includes a central portion between said beads of generally uniform wall thickness and opposite end portions disposed outwardly thereof, one of said end portions having a wall thickness which decreases in a direction outwardly from the adjacent central portion so as to facilitate the mounting of said tube in surrounding relation thereto.

6. A shock absorber as defined in claim 5 wherein the sleeve has an interior peripheral size which is normally slightly smaller than the exterior peripheral size of said inner tubular member and is expanded into said surrounding relation therewith.

* * * * *